US010773188B1

(12) United States Patent
Kulbeth

(10) Patent No.: US 10,773,188 B1
(45) Date of Patent: Sep. 15, 2020

(54) AIR DRILLING SOLIDS CONTROL SYSTEM AND METHOD

(71) Applicant: DEL Corporation, Lafeyette, LA (US)

(72) Inventor: Robert M. Kulbeth, Church Point, LA (US)

(73) Assignee: DEL Corporation, Lafeyette, LA (US)

( * ) Notice: Subject to any disclaimer, the term of this patent is extended or adjusted under 35 U.S.C. 154(b) by 112 days.

(21) Appl. No.: 16/229,324

(22) Filed: Dec. 21, 2018

Related U.S. Application Data

(60) Provisional application No. 62/608,988, filed on Dec. 21, 2017.

(51) Int. Cl.
*E21B 43/34* (2006.01)
*B01D 21/26* (2006.01)
*B01D 21/28* (2006.01)
*B01D 21/24* (2006.01)
*B01F 3/04* (2006.01)

(52) U.S. Cl.
CPC ....... *B01D 21/267* (2013.01); *B01D 21/2455* (2013.01); *B01D 21/2461* (2013.01); *B01D 21/283* (2013.01); *B01F 3/04241* (2013.01); *E21B 43/34* (2013.01); *B01F 2003/04375* (2013.01); *B01F 2215/0081* (2013.01)

(58) Field of Classification Search
CPC ... E21B 43/40; B01D 36/045; B01D 21/2488; B01D 21/2461; B01D 21/0012; B01D 19/0068; B01D 21/2444; B01D 21/2494; B01D 17/0214; B01D 21/02; B01D 21/267; B01D 33/0376; B01D 21/0045; B01D 21/0042; C02F 9/00; C02F 2001/007; C02F 2301/046; C02F 2103/10; C02F 1/40; C02F 1/20; C02F 1/38; C02F 1/004
See application file for complete search history.

(56) References Cited

U.S. PATENT DOCUMENTS

| 4,247,312 A | * | 1/1981 | Thakur | ............. | B01D 19/0042 96/159 |
|---|---|---|---|---|---|
| 6,506,310 B2 | | 1/2003 | Kulbeth | | |
| 6,808,626 B2 | | 10/2004 | Kulbeth | | |
| 6,976,819 B2 | | 12/2005 | Kulbeth | | |
| 7,514,011 B2 | | 4/2009 | Kulbeth | | |
| 8,449,779 B2 | | 5/2013 | Thompson | | |

(Continued)

OTHER PUBLICATIONS

Applicant's copending U.S. Appl. No. 16/131,900, filed Sep. 14, 2018.

(Continued)

*Primary Examiner* — Brad Harcourt
(74) *Attorney, Agent, or Firm* — Jones Walker LLP

(57) ABSTRACT

A system for separating solids from a first slurry mixture recovered from a hydrocarbon well. The system includes a V-shaped tank and one or more second mixing tanks for accumulating a slurry of fine particles from an overflow from the V-shaped tank. A shaftless auger moves solids to a conduit fluidly connected to hydrocyclones. The overflow of the hydrocyclones is mixed with the first flurry coming from a rig flow line and is discharged over a target plate and bar screen. Air is released from the mixture through one or more perforated baffles. Solids fall from the bar screen onto a shaker, which dewaters these solids as well as solids from an underflow from the hydrocyclones.

29 Claims, 7 Drawing Sheets

(56) References Cited

U.S. PATENT DOCUMENTS

| | | |
|---|---|---|
| 8,517,167 B2 | 8/2013 | Thompson |
| 8,808,354 B2 | 10/2014 | Kulbeth |
| 9,498,739 B2 | 11/2016 | Thompson |
| 9,597,614 B2 | 3/2017 | Thompson |
| 9,687,761 B2 | 6/2017 | Thompson |
| 2003/0136747 A1* | 7/2003 | Wood ................ B09C 1/06 |
| | | 210/774 |
| 2012/0318583 A1* | 12/2012 | Krohn ................ B09C 1/02 |
| | | 175/206 |

OTHER PUBLICATIONS

Applicant's copending U.S. Appl. No. 16/227,417, filed Dec. 20, 2018.

Applicant's copending U.S. Appl. No. 16/290,350, filed Mar. 1, 2019.

Applicant's copending U.S. Appl. No. 16/393,718, filed Apr. 24, 2019.

Applicant's copending U.S. Appl. No. 16/529,513, filed Aug. 1, 2019.

* cited by examiner

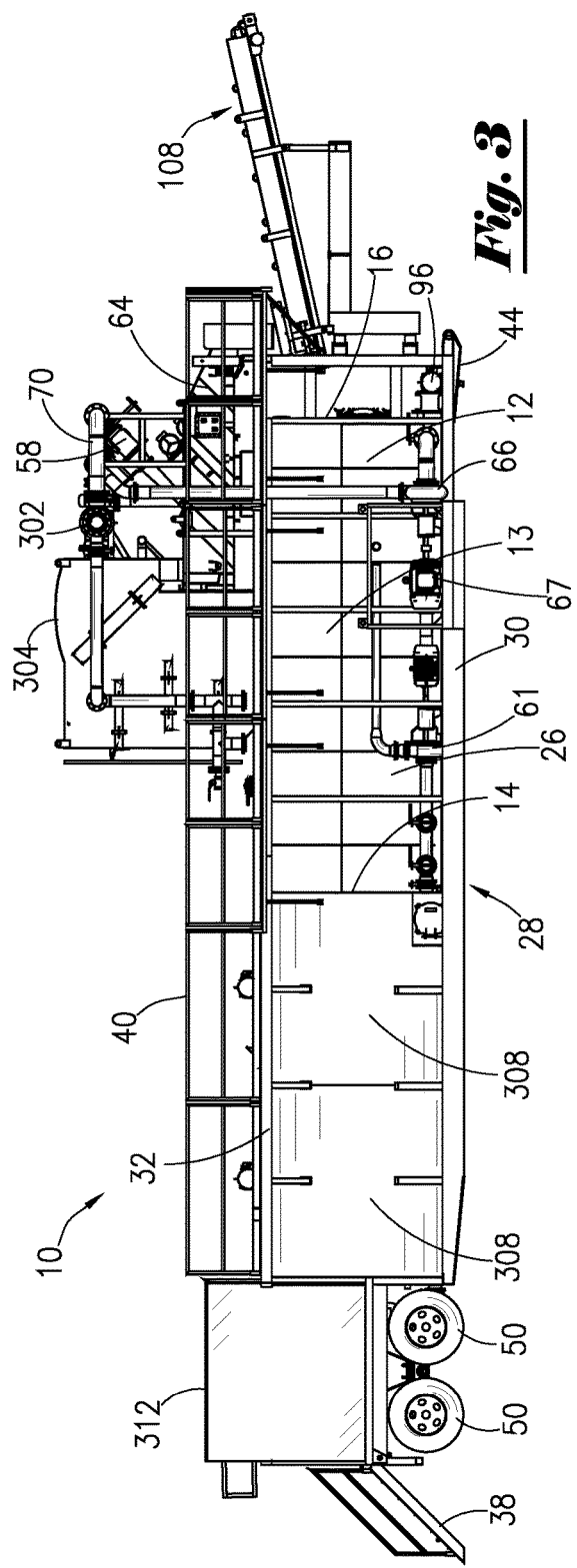
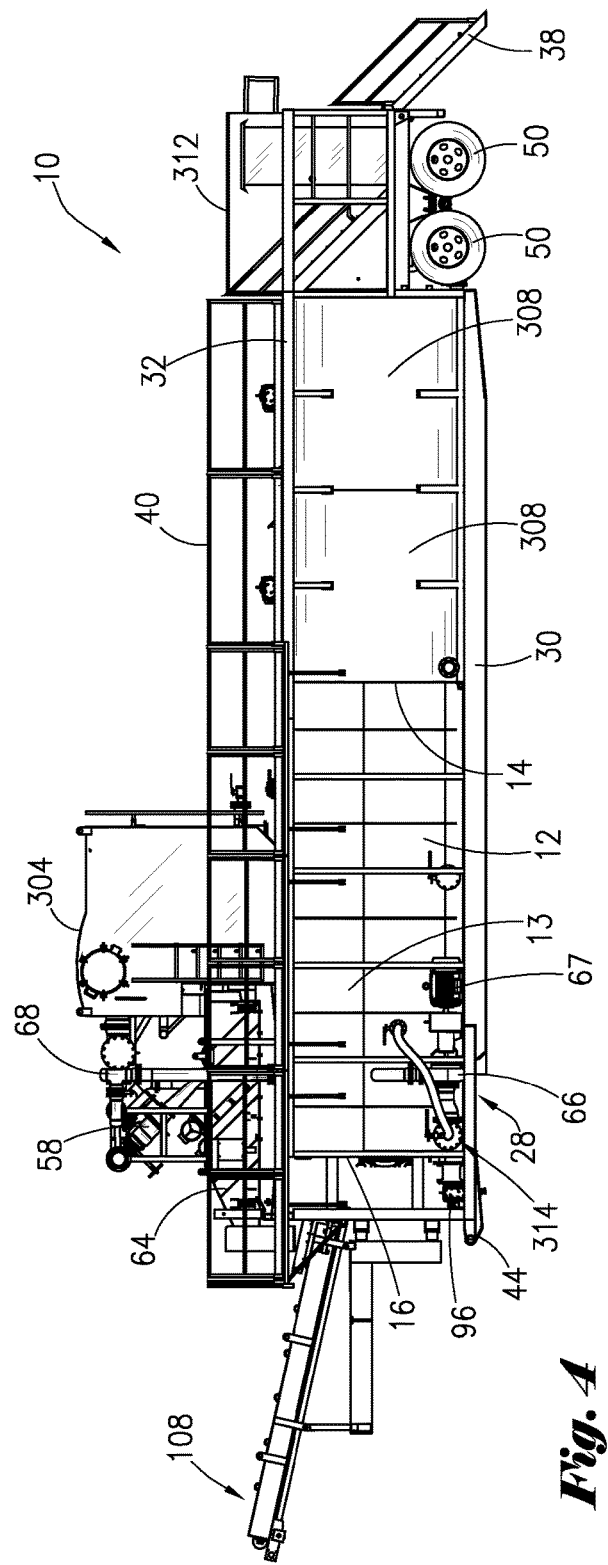

AIR DRILLING SOLIDS CONTROL SYSTEM AND METHOD

CROSS-REFERENCE TO RELATED APPLICATIONS

This application claims the benefit of and priority to U.S. Provisional Patent Application No. 62/608,988 filed on Dec. 21, 2017, which is incorporated herein by reference.

BACKGROUND

The disclosure relates to an air drilling solids control system for separating solids and gas from a fluid.

SUMMARY

In one embodiment, the system may include a first tank including a V-shaped compartment with sloping side walls, a bottom, and a top, the compartment having a front section, a mid-section, and a rear section. The system may include one or more second tanks coupled to one or more mixer devices configured to mix contents of the one or more second tanks, the one or more second tanks being located adjacent the rear section of the compartment. The system may include a shaftless auger operatively positioned on the bottom of the compartment, the shaftless auger configured for rotation to cause a second slurry containing first solids to move to the front section of the compartment. The system may include a suction pump in fluid communication with a first conduit, the first conduit having an inlet and an outlet, the inlet of the first conduit being operatively positioned within the compartment at its front section adjacent the shaftless auger, the suction pump configured to pump the second slurry containing the first solids through the first conduit. The system may include one or more hydrocyclone units in fluid communication with the outlet of the first conduit, the one or more hydrocyclone units receiving and processing the second slurry to produce an underflow comprising the first solids and an overflow comprising a first clean fluid flowing through a second conduit. The system may include a third conduit having an inlet and an outlet, the third conduit receiving the first slurry recovered from the hydrocarbon well at the inlet and flowing the first slurry through the outlet. The system may include a fourth conduit configured to receive the first clean fluid from the one or more hydrocyclone units and the first slurry flowing through the outlet of fourth conduit, the first clean fluid enveloping gas and second solids included in the first slurry to create a third slurry. The system may include a diffuser enclosure having a target plate, a bar screen positioned at an angle, a wear liner, and one or more perforated air diffuser baffles, wherein the diffuser enclosure receives on the target plate the third slurry from the fourth conduit, the target plate dispersing the third slurry onto the bar screen passing a fourth slurry through grates in the bar screen leaving third solids from the third slurry on a top surface of the bar screen, the bar screen passing a fifth slurry through the bar screen and into the compartment, wherein a first portion of entrained gas from the fourth slurry passes up through the one or more perforated air diffuser baffles. The system may include a linear shaker operatively positioned underneath the one or more hydrocyclone units, the linear shaker configured to receive the underflow from the one or more hydrocyclone units and third solids from the bar screen causing a dewatering of the first solids and of the third solids to produce a dried fourth solids, the linear shaker further configured to convey the dried fourth solids to a conveyor device for disposal, the linear shaker producing an underflow of a sixth slurry comprising a fifth solids, the linear shaker configured for depositing the sixth slurry into the compartment at front section. The system may include a perforated plate baffle placed in the compartment between the midsection and the front section, the perforated plate baffle causing a second portion of entrained gas from the fourth slurry to pass up to the linear shaker via a perforated plate bottom portion of the linear shaker. The system may include a first series of baffles operatively positioned within the compartment between the midsection and the rear section, wherein a seventh slurry containing unsettled fine solids flows over the first series of baffles and over an overflow weir at the rear section of the compartment and into the one or more mixing tanks for processing via the one or more mixers.

In another embodiment, the system may include a transfer pump that transfers fluid from the one or more mixing tanks to the third conduit or to the compartment.

In another embodiment, a first of the one or more mixing devices may be located at a top surface of a first of the one or more second tanks.

In another embodiment, the one or more second tanks comprises a plurality of second tanks and the one or more mixing device comprises a plurality of mixing devices.

In another embodiment, each of the plurality of second tanks may be coupled to a respective one of the plurality of mixing devices.

In another embodiment, the system may include an opening formed between a first and a second of the plurality of second tanks.

In another embodiment, the first tank and the one or more second tanks may be in fluid communication via an opening above the overflow weir.

In another embodiment, the linear shaker comprises a plurality of screen media.

In another embodiment, a first of the screen media may be configured to separate solids measuring greater than about 5/16 inches.

In another embodiment, a first of the screen media may be configured to separate solids measure greater than about ½ inches.

In another embodiment, one or more of the screen media may be configured to separate solids measuring greater than about 50 to 200 mesh.

In another embodiment, the first series of baffles comprises three baffles.

In another embodiment, baffles in the first series of baffles may be oriented at an angle between 45 and 90 degrees relative to a horizontal ground reference.

In another embodiment, the bar screen may be a grizzly bar screen.

In another embodiment, the bar screen comprises grates measuring about ½ inches.

In another embodiment, the second conduit may be a pipe having about an 8 inch inner diameter.

In another embodiment, the inlet of the third conduit has a larger inner diameter than the inner diameter of the outlet of the third conduit.

In another embodiment, the third conduit may be a pipe having a 10 inch inner diameter inlet and an 8 inch inner diameter outlet.

In another embodiment, the fourth conduit may be a pipe having a 12 inch inner diameter.

In another embodiment, the first series of baffles may be slanted in a first direction.

In another embodiment, the perforated plate baffles may be a perforated plate vertical baffles having slots measuring between about ⅜ inches-¾ inches.

The disclosure also relates to a method for separating solids from a first slurry recovered from a hydrocarbon well. The method may include the step of providing a tank as described hereinabove. The method may include the step of moving a second slurry containing first solids to the front section of the compartment by rotation of the shaftless auger. The method may include the step of pumping the second slurry containing the first solids through the first conduit to the one or more hydrocyclones. The method may include the step of processing the second slurry in the one or more hydrocyclones to produce an underflow comprising the first solids and an overflow comprising a first clean fluid flowing through the second conduit. The method may include the step of receiving the first slurry recovered from the hydrocarbon well at the inlet of the third conduit and flowing the first slurry through the outlet of the third conduit. The method may include the step of flowing the first clean fluid from the one or more hydrocyclone units and the first slurry flowing through the outlet of fourth conduit into the diffuser enclosure, the first clean fluid enveloping gas and second solids included in the first slurry to create a third slurry. The method may include the step of dispersing the third slurry on the target plate and onto the bar screen to pass a fourth slurry through grates in the bar screen leaving third solids from the third slurry on a top surface of the bar screen, wherein a first portion of entrained gas from the fourth slurry passes up through the one or more perforated air diffuser baffles. The method may include the step of passing a fifth slurry through the grizzly bar screen and into the compartment. The method may include the step of depositing the underflow from the one or more hydrocyclone units and the third solids from the grizzly bar screen on the linear shaker. The method may include the step of dewatering the first solids and the third solids on the linear shaker to produce a dried fourth solids for conveyance to a conveyor device for disposal. The method may include the step of depositing an underflow of a sixth slurry comprising a fifth solids by the linear shaker into the compartment at its front section. The method may include the step of causing a second portion of entrained gas from the fourth slurry to pass up to the linear shaker via the perforated plate bottom portion of the linear shaker. The method may include the step of flowing a seventh slurry containing unsettled fine solids over the first series of baffles over an overflow weir at the rear section of the compartment and into the one or more mixing tanks for processing via the one or more mixers.

In another embodiment, the system may include a transfer pump, and the method may further include transferring fluid from the one or more mixing tanks to the third conduit or to the compartment via the transfer pump.

In another embodiment, the method may further include treating the fluid in the one or more second tanks with a chemical.

In another embodiment, the method may further include separating solids greater than about 5/16 inches with a screen media of the linear shaker.

In another embodiment, the method may further include separating solids greater than about ½ inches with a screen media of the linear shaker.

In another embodiment, the method may further include separating solids greater than about 50 to 200 mesh with a screen media of the linear shaker.

In another embodiment, the method may further include separating solids greater than about ½ inches with the bar screen.

In another embodiment, the bar screen may be a grizzly bar screen, and steps (g) and (h) in the method may be performed with the grizzly bar screen.

BRIEF DESCRIPTION OF THE DRAWINGS

FIG. 3 is a left-side view of an embodiment of the air drilling solids control system.

FIG. 4 is a right-side view of an embodiment of the air drilling solids control system.

DETAILED DESCRIPTION OF THE DISCLOSURE

Figure 5:
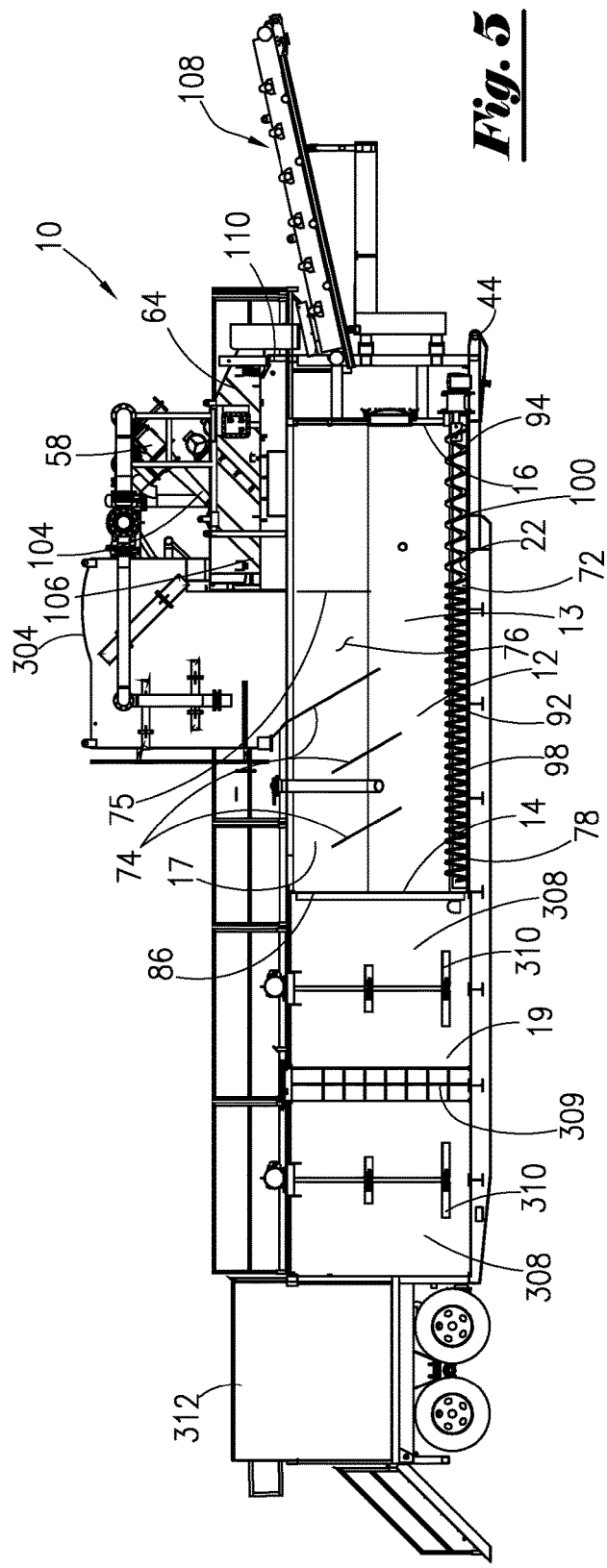
FIG. 5 is a partial cross-sectional left-side view of an embodiment of the air drilling solids control system.

With reference to the figures where like elements have been given like numerical designation to facilitate an understanding of the disclosure, and particularly with reference to the embodiment of the disclosure illustrated in FIGS. 1, 2, 3, and 4, air drilling solids control system 10 may include tank 12. Tank 12 may have a first compartment 13. Tank 12 may include rear wall 14 and front wall 16. The rear wall 14 may form an overflow weir 86 that may function to flow contents of tank 12 into one or more mixing tanks 308 located adjacent rear wall 14. First compartment 13 may be defined by rear wall 14, internal wall 17, right side wall 18, left side wall 20, and bottom wall 22. First compartment 13 may be V-shaped or partially V-shaped. First compartment 13 may be configured with tapering or V-shaped right and left side walls 18, 20. Right and left side walls 18, 20 may each include lower section 24, 26 tapering in the direction of bottom wall 22. Rear wall 14 may be substantially vertical. The angle of lower sections 24, 26 may be in the range of 30 degrees to 90 degrees relative to the horizontal ground. As seen in FIGS. 1-4, there may two mixing tanks 308 located behind the rear wall 14. In some embodiments, there may be a few as one mixing tank 308, and in other embodiments, there may be more than two mixing tanks 308. Mixing tanks 308 may include an internal surface 19 and may hold fluid inside. Each mixing tank 308 may be coupled to a mixer 310, which may be located at, near, or on a top surface of the mixing tank 308. The mixer 310 may be a device that may function to stir, agitate, or otherwise mix the contents of the mixing tank 308. In one example, the mixer 310 may include one or more rods and/or one or more paddles coupled to the rods, such as seen in FIG. 5. Mixing tank 308 may be substantially closed, with an opening above the weir 86, which connects to tank 12, and may have an opening connecting to mixer 310. The top edge of overflow weir 86 may be in the range of approximately 1 foot to 7 feet from the top of compartment 13. The bottom edge of weir 86 may be coupled to bottom wall 22. Overflow weir 86 allows floating debris (e.g., fine particulates/solids) to gain entrance to mixing tank 308. In some embodiments, when there are more than one mixing tanks 308, each mixing tank 308 may include an opening 309 to allow contents from one mixing tank 308 to flow to another adjacent mixing tank 308. System 10 may include a control room 312 located at the rear of the system 10 adjacent to the one or more mixing tanks 308. Batteries, electronics, gears, and the like may be housed in control room 312.

Tank 12 may have a height in the range of 6 feet to 10 feet, a length in the range of 30 feet to 50 feet, and a width in the range of 8 feet to 12 feet. Tank 12 may hold a volume of slurry in the range of 4,200 gallons to 45,000 gallons. Tank 12 may be composed of metal.

Each mixing tank 308 may have a height in the range 6 feet to 10 feet, a length in the range of 15 feet to 50 feet, and a width in the range of 8 feet to 12 feet. Tank 308 may hold a volume of slurry in the range of 1,000 gallons to 20,000 gallons. Tank 308 may be composed of metal.

Again with reference to FIGS. 1-4, tank 12 may be housed within supporting frame 28. Supporting frame 28 may be made of metal and comprise a unitary construction or be constructed with component parts that may be fixedly (e.g., by welding) or detachably secured (by bolts, rivets or the like). Supporting frame 28 may include bottom horizontal frame 30 and top horizontal frame 32. Bottom and top horizontal frames 30, 32 may be interconnected by a plurality of vertical support members 34. Top horizontal frame 32 supports deck 36 that may be positioned above the top of tank 12. Deck 36 may be accessible to personnel operating system 10 by stairway 38. Guardrail 40 may extend around the periphery of deck 36.

With reference again to FIGS. 1-4, system 10 may be configured to be transportable. For example, bottom frame 30 may include hitch member 44 for connection to a towing vehicle such as a truck. Bottom frame 30 may be affixed with a wheel assembly 48 that includes two or more wheels 50. As seen in FIGS. 1-4, there may be eight wheels 50. System 10 can then be transported to and from the work site by lifting at the hitch member 44.

When fully assembled, system 10 may have overall dimensions that include a height in the range of about 9 feet to about 20 feet, a length in the range of about 30 feet to about 55 feet, a width in the range of about 8 feet to about 18 feet.

Figure 1:
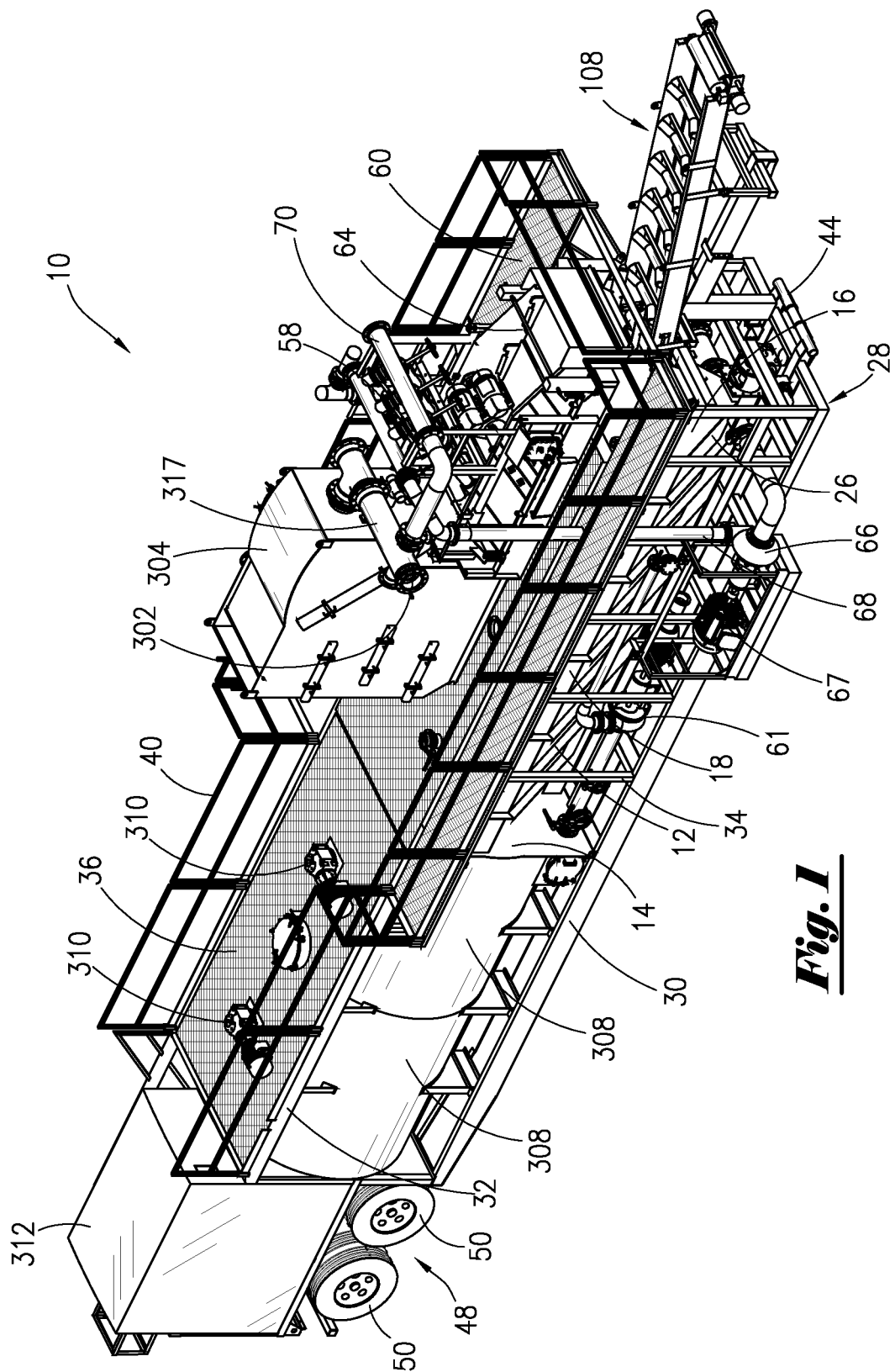
FIG. 1 is a perspective left-side view of an embodiment of the air drilling solids control system.
Figure 2:
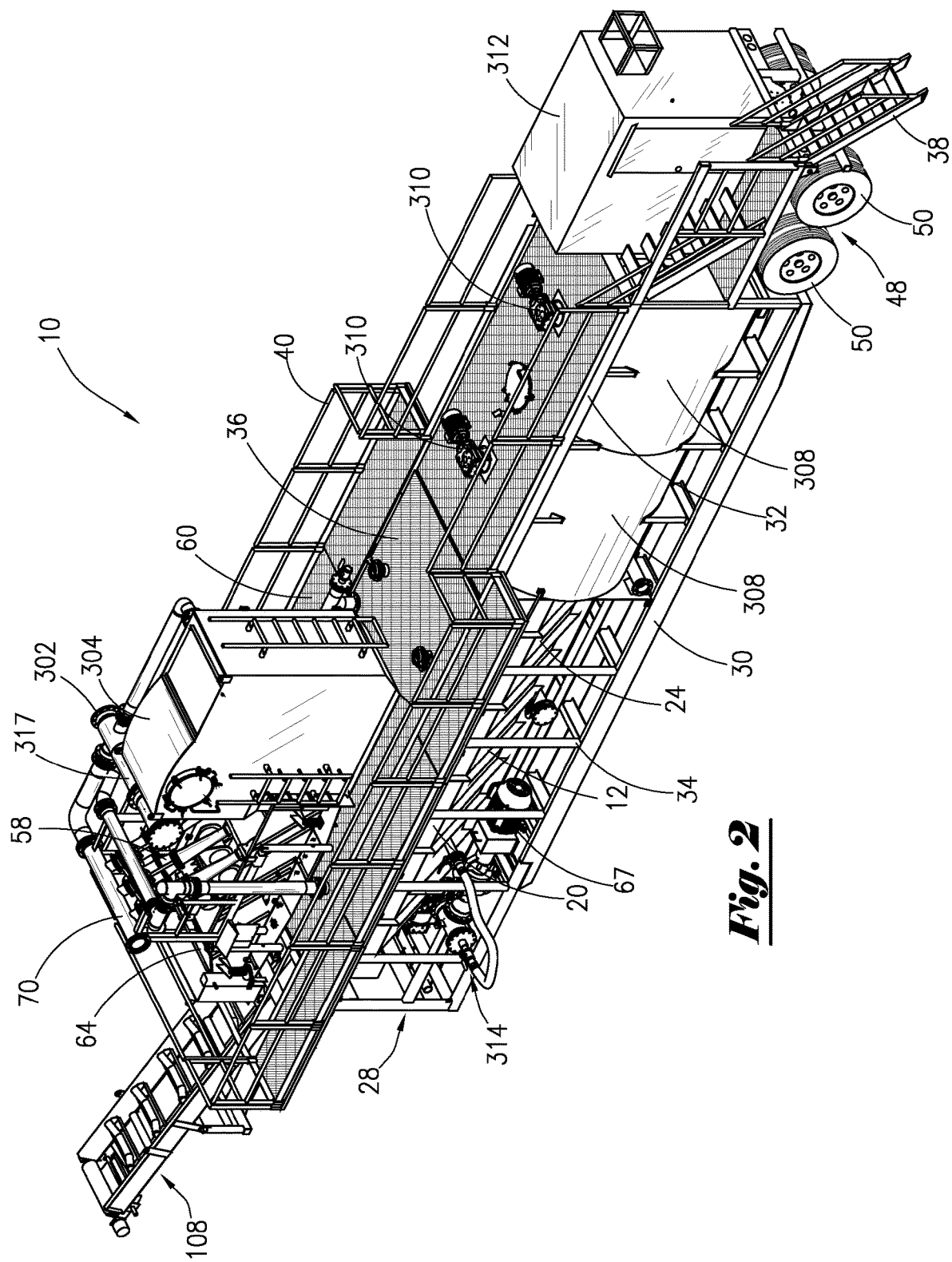
FIG. 2 is a perspective right-side view of an embodiment of the air drilling solids control system.

As also shown in FIGS. 1-4, system 10 may include one or more hydrocyclones 58 operatively positioned at front deck section 60 on deck 36 and operatively mounted over linear shaker 64. Hydrocyclones 58 are commercially available from Krebs Engineering, Inc. under the trade name Cyclone. FIGS. 1 and 2 show system 10 with three hydrocyclones 58. It is to be understood that less than three or more than three hydrocyclones 58 may be incorporated into system 10 depending on operational parameters. Hydrocyclones 58 function to separate solids from fluid within the slurry. Hydrocyclones 58 works particularly well in separating sand and silt from fluid streams. The underflow of hydrocyclones 58 contains the separated solids and may be discharged onto shaker 64 (discussed below in more detail). The overflow contains the processed fluid in which solids have been removed or substantially removed. As shown in FIGS. 1-4, hydrocyclones 58 may be tilted at an angle relative to the ground. In an alternative embodiment, hydrocyclones 58 may be substantially vertically placed. Hydrocyclones 58 may be connected in a rack assembly that may be foldable for transport.

As seen in FIGS. 1-4, system 10 may include linear shaker 64. Linear shaker 64 may contain vibrating screen media 65 (shown in FIG. 8) that functions to dewater and dry solids discharged onto screens 65. In some embodiments, the vibrating screen media 65 may include one or more vibrating mesh screens that may be made of metal, such as stainless steel. In some embodiments, the vibrating screen media 65 may include one or more polyurethane slotted screens. Linear shaker 64 is commercially available from DEL Corporation under the trade name Linear Shaker.

FIGS. 1-4 also illustrate that system 10 may include hydrocyclone feed pump 66 that suctions the solids settling at the bottom of compartment 13 of tank 12 and pumps the solids in the slurry through conduit 68 to hydrocyclones 58 for processing. Hydrocyclone feed pump 66 may be any type of pump capable of generating pressures sufficient to pump the slurry to the hydrocyclones 58. For example, pump 66 may be a centrifugal pump operated by motor 67. Motor 67 may be an electric motor. It is to be understood that other types of pump motors may be used in system 10 such as a pneumatic or hydraulic motor. In some cases, hydrocyclone feed pump 66 might begin to operate only after the fluid level in tank 12 rises to within a certain level (e.g., within three feet of the top of tank 12). In some cases, hydrocyclone feed pump 66 might begin to operate automatically when the fluid level rises to a particular level (e.g., within three feet from the top of tank 12). In some embodiments, the hydrocyclones 58 may be valved such that one or two hydrocyclones 58 can be run as primary while the other one(s) may be standby, or all three may be run as primary. The pump speed of pump 66 may be varied with a variable frequency drive (VFD) to achieve the proper flow rate for a particular scenario.

With reference to FIGS. 1-4 and 9, system 10 may include conduit 70 operatively associated with or fluidly connected to hydrocyclones 58. Conduit 70 flows the overflow from hydrocyclones 58 (processed fluid) to a diffuser box conduit 317, which feeds into diffuser box 304. For example, the overflow from the hydrocyclones 58 may be approximately 1000 gpm and may flow through conduit 70 that may have about an 8 inch inner diameter (ID) that may tee into conduit 317 that may have a 12 inch ID that may discharge into the diffuser box 304. The ID of conduit 70 may be reduced relative to the ID of conduit 317. The diffuser box 304 may be substantially enclosed in an enclosure. In some embodiments, the diffuser box 304 may be lined with a polyurethane liner, which may provide some protection and waterproofing of the enclosure.

The air/water/solids flow from a hydrocarbon conduit 302 (e.g., Rig Flow Line or Shale Gas Separator) may flow into conduit 317 via conduit 302. Conduit 302 may include a first section having an enlarged ID relative to the ID of a second section of conduit 302. For example, conduit 302 may include first section having about a 10 inch ID inlet. The second section of conduit 302 may have about an 8 inch ID downstream of where conduit 70 tees into conduit 317. The overflow from the hydrocyclones 58 may envelop the air/water/solids flow from the Rig Flow Line or Shale Gas Separator flowing through conduit 302 in order to dilute and diminish any foam or dust entrained in the flow. The combined air/water/solids flow from the rig flow line or shale gas separator and the hydrocyclone overflow flows into and through conduit 317 into diffuser box 304 and onto a target plate 315, which may be located on a grizzly bar screen 316. In some embodiments, the target plate 315 may be constructed of AR400 abrasion resistant steel. In some embodiments, fluid from the target plate 315 may be dispersed onto a declined ½" static grizzly bar screen 316.

The solids (e.g., +½" solids) from the flow may be discarded off the grizzly bar screen 316 and onto a first screen panel 65 on the linear shaker 64 located below the grizzly bar screen 316. Screen panel 65 may be a 5/16" perforated plate screen, but the size of the openings may vary. The solids (e.g., +5/16" solids) may be conveyed onto one or more subsequent screens, such as onto the next four finer mesh (50-200 mesh) SST wire mesh or Polyurethane panels, consecutively, and then may be discharged onto a pivoting inclined belt conveyor 108. The belt conveyor 108 may convey the dewatered solids into a roll-off, cuttings box, or similar container to accommodate loading for haul off to disposal or into a stockpile.

The solids (e.g., −½" solids) that pass through the grizzly bar screen 316 along with water and air may flow into the open top of tank 12 into the compartment 13. The solids (e.g., −½" solids) may settle to the bottom of the tank 12, and may be conveyed to the hydrocyclone feed pump 66 via a shaftless auger 92.

Figure 6:
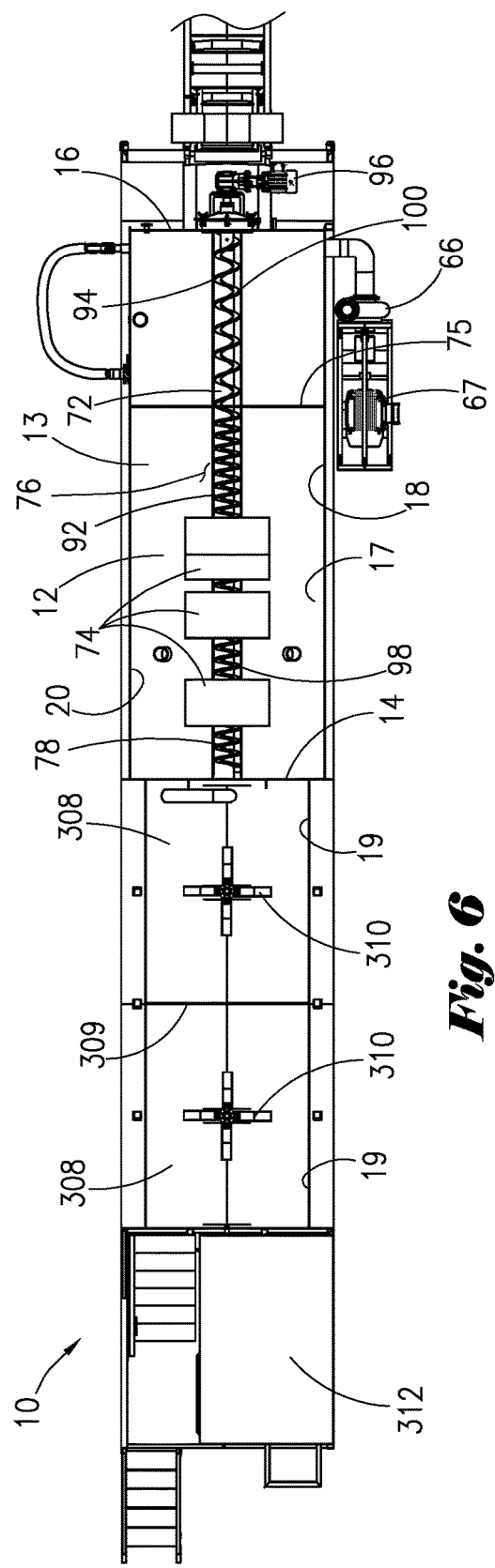
FIG. 6 is a partial cross-sectional top view of an embodiment of the air drilling solids control system.
Figure 7:
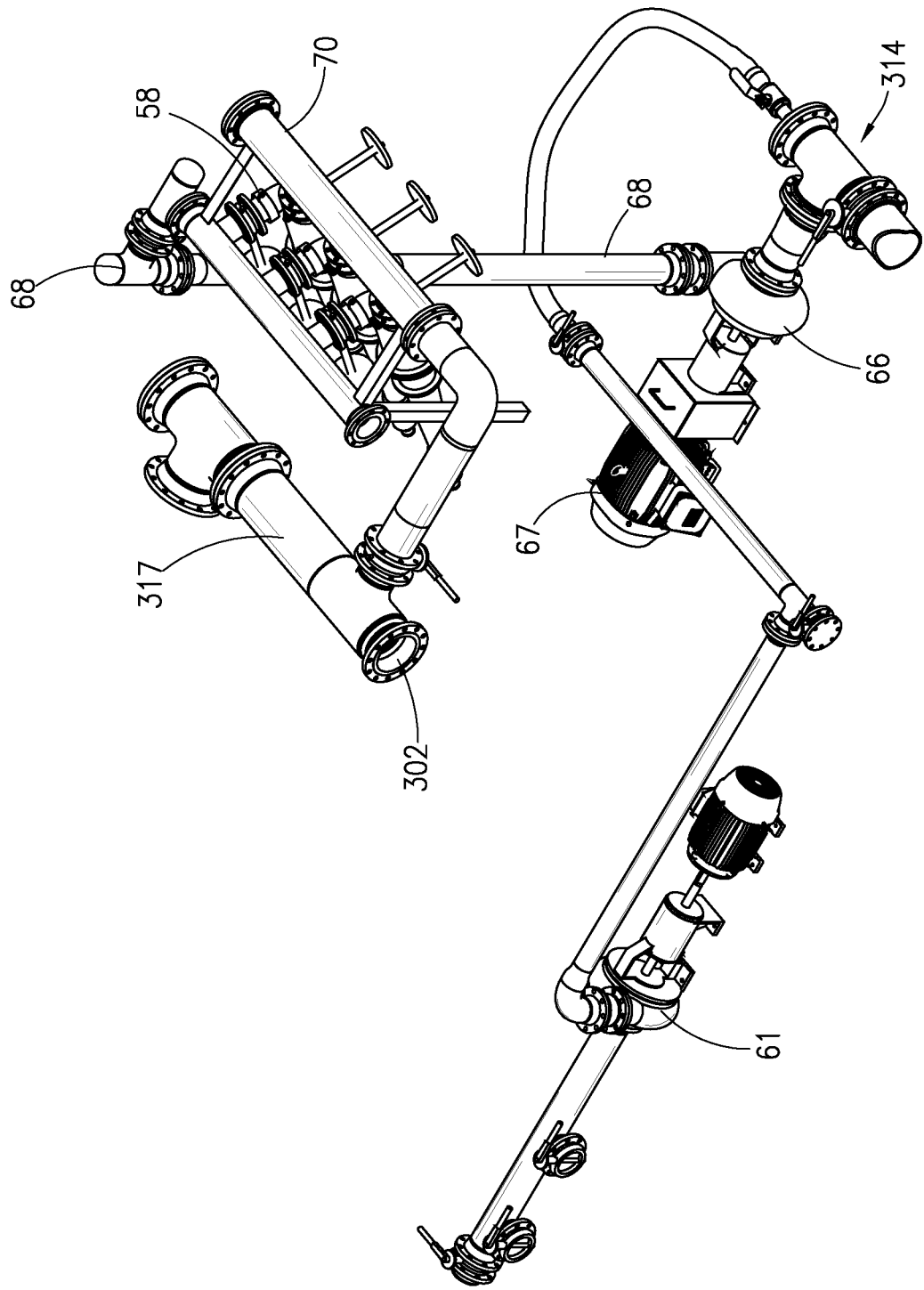
FIG. 7 is schematic diagram of an embodiment of the air drilling solids control system.

FIGS. 5 and 6 show the placement of shaftless auger 92 at the bottom of compartment 13 of tank 12, and FIG. 7 illustrates the coupling of conduits and components of system 10. Auger 92 is commercially available from Falcon Industries, Inc. under the trade name Shaftless Screw Conveyor. Auger 92 extends substantially the length of compartment 13 from internal front section 94 to rear section 78. Auger 92 may be operatively connected to auger motor 96, which serves to rotate auger 92 to facilitate the movement of solids that have settled to the bottom of internal area 72 in the direction from rear section 78 to front section 94. Motor 96 may be controlled by a variable frequency drive (VFD) so that the speed of rotation may be varied. Thus, the operator may vary the speed of rotation of auger 92 so that the shaftless auger 92 may vary the concentration of solids going to hydrocyclone feed pump 66. For example, the operation of auger 92 may convey a heavier concentration of solids to hydrocyclone feed pump 66 (by decreasing rotation speed) or alternatively may convey a reduced concentration of solids to hydrocyclone feed pump 66 (by increasing rotation speed). In some embodiments, a variable frequency drive (VFD) on hydrocyclone feed pump 66 can vary the speed and/or pump pressure of the pump 66, which may vary the flow rate and/or concentration to pull more or less liquid into the hydrocyclone feed pump 66. The speed and/or pump pressure of the pump 66 can be monitored and adjusted by adjusting the VFD. The pump pressure may be any suitable pressure, such as between approximate 5 to 40 psi. In some embodiments, the pump pressure may be initially operated at about 20 psi and may be maintained between 15-20 psi. In some cases, the speed of the motor 96 may be 900 rpm, or any suitable speed. In some cases, the auger 92 may start to operate after hydrocyclone feed pump 66 is energized.

Auger 92 may include half pitch section 98 and a full pitch section 100. Full pitch section 100 may be located at front section 94 at or near the intake of hydrocyclone feed pump 66. In half pitch section 98, flights of auger 92 may be spaced apart in the range of about 4.5 inches to about 9 inches. In full pitch section 100, flights of auger 92 may be spaced apart in the range of about 9 inches to about 18 inches. The flights may have a diameter in the range of 9 inches to 18 inches, for example 12 inch diameter. In one embodiment, the diameter of the flights may be the same as the distance between flights in the full pitch section. Solids settled in half pitch section 98 exhibit an increase in the height as compared to the solids settled in full pitch section 100. The reduction of solid height at full pitch section 100 reduces clogging at the inlet of hydrocyclone feed pump 66. In some cases, auger 92 may automatically begin to operate when hydrocyclone feed pump 66 is energized.

The solids (e.g., −½" solids) that may settle to the bottom of tank 12 may be conveyed to the hydrocyclones 58 via the pump 66. Hydrocyclones 58 may be equipped with 3" apexes that may be used to prevent plugging. The solids may be discharged from the apexes of the hydrocyclones 58 onto a screen panel of the shaker 64. For example, the solids may be discharged onto a second screen panel 65 of shaker 64, which may be a 50-200 mesh SST wire mesh or polyurethane screen panel. The solids may be dewatered on this screen panel 65, and passed on to subsequent screens of the shaker 64, such as to three more screens, which may also be 50-200 mesh.

The underflow or solids discharged out of bottom 104 of each hydrocyclone 58 onto proximal end 106 of linear shaker 64 and may be screened by linear shaker 64 to dewater or dry the discharged solids. The dried solids may be conveyed on screens 65 to conveyor 108 positioned at a distal end 110 of the linear shaker 64.

The dewatered solids may then be discharged onto the pivoting belt conveyor 108. The belt conveyor 108 may convey the dewatered solids into a roll-off, cuttings box, or similar container to accommodate loading for haul off to disposal or into a stockpile. The water overflow from the hydrocyclones 58 (e.g., approximately 1000 gpm), may be recycled back through the 12" conduit 317 into the diffuser box 304.

Air from the fluid flowing through the grizzly bar screen 316 may include gas/air, which may have two possible flow paths to the atmosphere. A first flow path may be up through a diffuser section of the diffuser box 304 that may include one or more perforated plate baffles 318 that may be substantially evenly spaced vertically and staggered horizontally. In one example, the baffles 318 may be four ¼" perforated plate baffles. In one example, the baffles 318 may be spaced apart by about 12 inches. In some cases, the baffles 318 may be staggered, such that one or more of baffles 318 may be placed closer to rear section 78 than other of the baffles 318.

The second flow path for the air is through a plate vertical baffle 75, which may be placed at substantially the mid-section 76 in the compartment 13 of tank 12, and up through a perforated plate bottom of the linear shaker 64. In one example, the vertical baffle 75 may be a ⅜"-¾" perforated plate vertical baffle and may be substantially vertically placed at a 90 degree angle relative to bottom wall 22.

The solids (e.g., −5/16" solids) that pass through the first screen panel 65 of the linear shaker 64 may settle to the bottom of the compartment 13 and may follow the same path or process as the solids (e.g., −½" solids) that pass through the grizzly bar screen 316.

The −50-200 mesh solids that pass through the 50-200 mesh screens 65 on the linear shaker 64 along with any fines (fine particles) that escape through the hydrocyclone overflow that do not settle to the bottom of compartment 13 may flow through one or more titled plate baffles 74, and then may overflow into a mixing tank 308 over the overflow flow weir 86. Baffles 74 may be located between front section 94 and mid-section 76 of compartment 13 in spaced relation. Baffles 74 may cause settling of at least some solids that contact baffles 74. Baffles 74 may extend or hang from the top of tank 12. Baffles 74 may be tapered at their sides and in the direction of bottom wall 22 to conform to the V-shaped profile of compartment 13. Baffles 74 may also be angled or tilted. Baffles 74 may be tilted at an angle in the range of 45 degrees to 90 degrees relative to the horizontal ground. In some embodiments, baffles 74 may be tilted in the direction of fluid flow through compartment 13 of tank 12. Baffles 74 may all be tilted in the same direction. For example, as shown in FIG. 5, baffles 74 may be tilted such that the upper portions of baffles 74 may be positioned closer to the rear section 78 of tank 12. One or more of the baffles 74 may extend higher than other baffles 74, such as to connect to diffuser box 304, such as shown in FIG. 5.

After the mixing tank 308 is filled to a desired level with the fines-slurry, the slurry can be chemically treated, in some embodiments, and then be pumped to additional processing equipment such as a belt press, filter press, centrifuge, or any other type of fine solids separation/dewatering equipment for removal and dewatering of the fine solids. In some cases, clean water resulting from this additional processing may be recycled back to conduit 302 or to compartment 13 of tank 12 for dilution to eliminate foam or to thin out the slurry via a transfer pump 61 that may be mounted adjacent to the left wall 18 adjacent to the tank 12. The transfer pump 61 may be manifolded to allow for transfer from a mixing tank 308, or from a frac tank or other water storage tank on site. The transfer pump 61 may also be manifolded to allow for feeding of water to a suction jet 314 to dilute the feed at the suction to eliminate clogging.

The underflow from hydrocyclones 58 (solids) may be deposited on linear shaker 64 for dewatering and then conveyed to conveyor 108 for discarding. The incline of the shaker 64 may be adjusted depending on desired dryness and conveyance of solids/material. The shaker 64 may include a dam on the discharge end to enhance the dewatering of the material.

Figure 8:
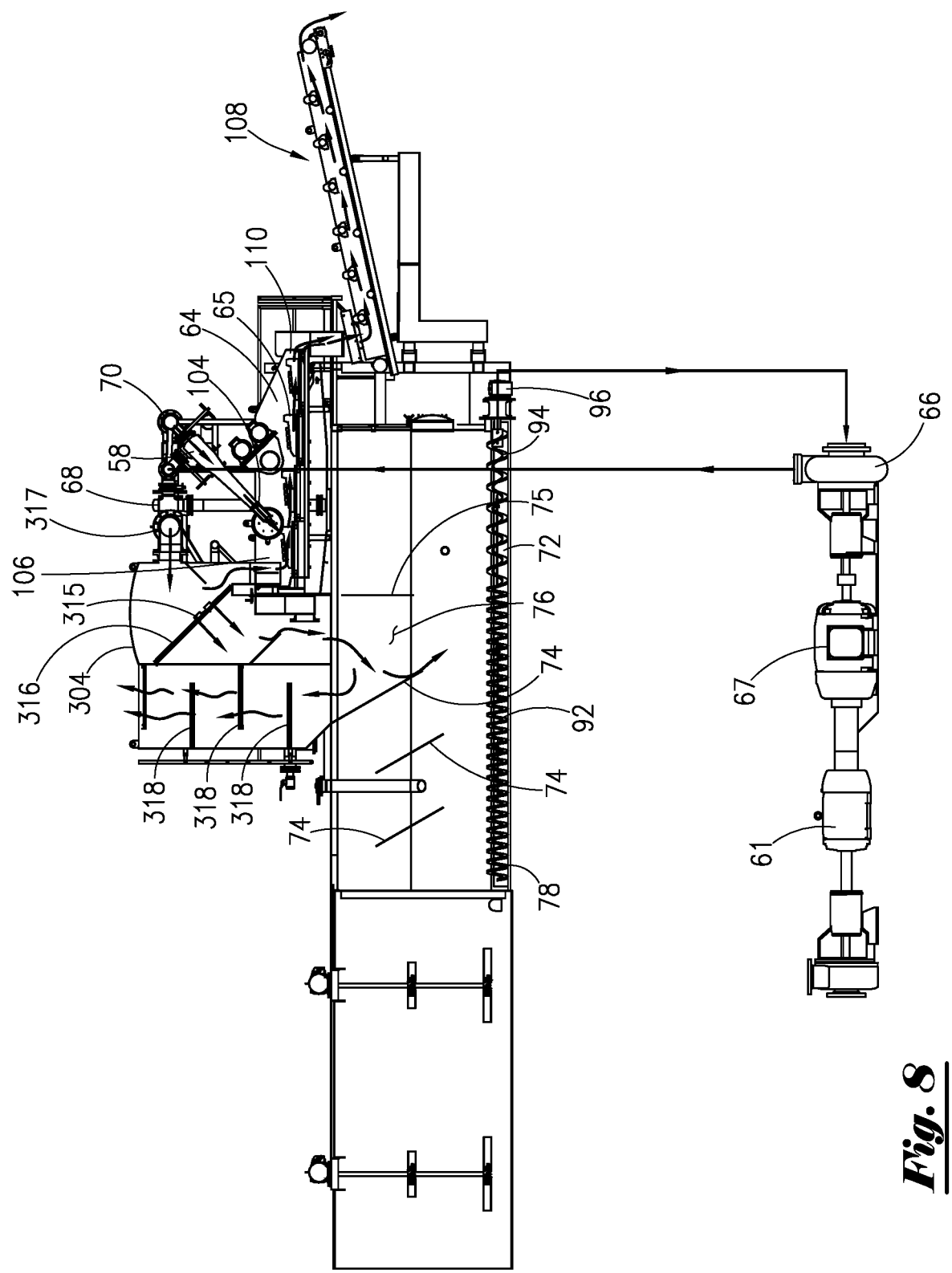
FIG. 8 is a schematic flow diagrams of an embodiment of the air drilling solids control system showing processing of the slurry.
Figure 9:
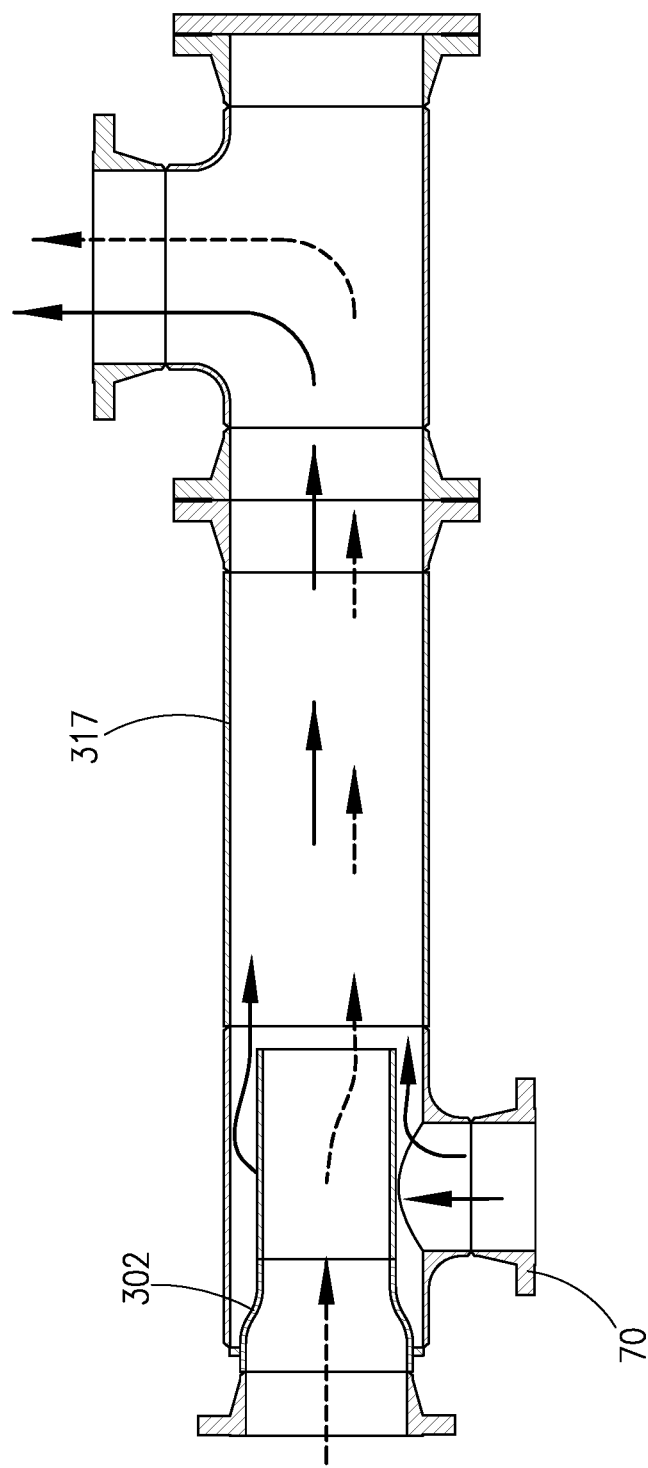
FIG. 9 is a schematic flow diagrams of an embodiment of the air drilling solids control system showing processing of the slurry.

FIGS. 8 and 9 are flow diagrams showing the processing of the slurry. As shown, feed from a flow line from a hydrocarbon well may come in system 10 via a 10 inch inlet or first section into the second section or an 8 inch section of conduit 302, which may flow into a 12 inch conduit 317. The feed from the hydrocarbon well may include foam, water, dust, rock, and sand. Mixing this flow with the hydrocyclone overflow may dilute and knock down the dust, rock, sand, and foam. An 8 inch hydrocyclone overflow conduit 70 may also connect into the 12 inch conduit 317. This mixture may flow through conduit 317 into the diffuser box 304 and onto a target plate 315, which may be located on a grizzly bar screen 316. Fluid from the target plate 316 may be dispersed onto a declined portion of the ½" static grizzly bar screen 316 (e.g., ½" openings in the screen 316).

The +½" solids fall from the grizzly bar screen 316 and onto a first screen panel 65 on the linear shaker 64 located below the grizzly bar screen 316, which proceeds to dewater these solids by progressing the solids over successive screens. This screen panel 65 may be a 5/16" perforated plate screen, and the +5/16" solids may be conveyed onto subsequent screens, and then may be discharged onto a pivoting inclined belt conveyor 108.

The −½" solids that pass through the grizzly bar screen 316 along with water and air may flow into the open top of tank 12 into the compartment 13. The hydrocyclone feed pump 66 may feed the −½" solids that settle on the bottom of the tank 12 to the hydrocyclone feed pump 66 by use of a shaftless auger 92. Hydrocyclones 58 may deposit solids onto shaker 64. These solids may be dewatered and deposited to the conveyor 108. The water overflow from the hydrocyclones 58 may flow through the 12" conduit 317 into the diffuser box 304 (described above).

Air from the fluid flowing through the grizzly bar screen 316 may flow up through a diffuser section of the diffuser box 304 that may include one or more perforated plate baffles 318. Air from the fluid flowing through the grizzly bar screen 316 may also flow through a plate vertical baffle 75 in the compartment 13 and then up through a perforated plate bottom of the linear shaker 64.

The −5/16" solids that passed through the first screen panel 65 of the linear shaker 64 may settle to the bottom of the compartment 13 and may follow the same path or process as the −½" solids that pass through the grizzly bar screen 316.

The −50-200 mesh solids that pass through the 50-200 mesh screens 65 on the linear shaker 64 along with any fines that escape through the hydrocyclone overflow that do not settle to the bottom of compartment may flow through one or more titled plate baffles 74, and then may overflow into a mixing tank 308 over the overflow flow weir 86. Clean water resulting from processing of the contents of the mixing tank 308 may be recycled back to the Rig Flow Line conduit 302 or to compartment 13 of tank 12 for dilution to eliminate foam or to thin out the slurry via a transfer pump 61 that may be mounted adjacent to the left wall 18 adjacent to the tank 12.

According to features described herein, dimensions are approximate and may be scaled to size based on desired sizing and scaling.

While preferred embodiments of the disclosure have been described, it is to be understood that the embodiments described are illustrative only and that the scope of the disclosure is to be defined solely by the appended claims when accorded a full range of equivalence, many variations and modifications naturally occurring to those skilled in the art from a perusal hereof.

What is claimed is:

1. A system for separating solids from a first slurry mixture recovered from a hydrocarbon well, comprising:
   a first tank including a V-shaped compartment with sloping side walls, a bottom, and a top, the compartment having a front section, a mid-section, and a rear section;
   one or more second tanks coupled to one or more mixer devices configured to mix contents of the one or more second tanks, the one or more second tanks being located adjacent the rear section of the compartment;
   a shaftless auger operatively positioned on the bottom of the compartment, the shaftless auger configured for rotation to cause a second slurry containing first solids to move to the front section of the compartment;
   a suction pump in fluid communication with a first conduit, the first conduit having an inlet and an outlet, the inlet of the first conduit being operatively positioned within the compartment at its front section adjacent the shaftless auger, the suction pump configured to pump the second slurry containing the first solids through the first conduit;
   one or more hydrocyclone units in fluid communication with the outlet of the first conduit, the one or more hydrocyclone units receiving and processing the second slurry to produce an underflow comprising the first solids and an overflow comprising a first clean fluid flowing through a second conduit;
   a third conduit having an inlet and an outlet, the third conduit receiving the first slurry recovered from the hydrocarbon well at the inlet and flowing the first slurry through the outlet;

a fourth conduit configured to receive the first clean fluid from the one or more hydrocyclone units and the first slurry flowing through the outlet of fourth conduit, the first clean fluid enveloping gas and second solids included in the first slurry to create a third slurry;

a diffuser enclosure having a target plate, a bar screen positioned at an angle, a wear liner, and one or more perforated air diffuser baffles, wherein the diffuser enclosure receives on the target plate the third slurry from the fourth conduit, the target plate dispersing the third slurry onto the bar screen passing a fourth slurry through grates in the bar screen leaving third solids from the third slurry on a top surface of the bar screen, the bar screen passing a fifth slurry through the bar screen and into the compartment, wherein a first portion of entrained gas from the fourth slurry passes up through the one or more perforated air diffuser baffles;

a linear shaker operatively positioned underneath the one or more hydrocyclone units, the linear shaker configured to receive the underflow from the one or more hydrocyclone units and third solids from the bar screen causing a dewatering of the first solids and of the third solids to produce a dried fourth solids, the linear shaker further configured to convey the dried fourth solids to a conveyor device for disposal, the linear shaker producing an underflow of a sixth slurry comprising a fifth solids, the linear shaker configured for depositing the sixth slurry into the compartment at its front section;

a perforated plate baffle placed in the compartment between the midsection and the front section, the perforated plate baffle causing a second portion of entrained gas from the fourth slurry to pass up to the linear shaker via a perforated plate bottom portion of the linear shaker; and a first series of baffles operatively positioned within the compartment between the midsection and the rear section, wherein a seventh slurry containing unsettled fine solids flows over the first series of baffles and over an overflow weir at the rear section of the compartment and into the one or more mixing tanks for processing via the one or more mixers.

2. The system of claim 1, further comprising a transfer pump that transfers fluid from the one or more mixing tanks to the third conduit or to the compartment.

3. The system of claim 1, wherein a first of the one or more mixing devices is located at a top surface of a first of the one or more second tanks.

4. The system of claim 1, wherein the one or more second tanks comprises a plurality of second tanks and the one or more mixing device comprises a plurality of mixing devices.

5. The system of claim 4, wherein each of the plurality of second tanks is coupled to a respective one of the plurality of mixing devices.

6. The system of claim 4, further comprising an opening formed between a first and a second of the plurality of second tanks.

7. The system of claim 1, wherein the first tank and the one or more second tanks are in fluid communication via an opening above the overflow weir.

8. The system of claim 1, wherein the linear shaker comprises a plurality of screen media.

9. The system of claim 8, wherein a first of the screen media is configured to separate solids measuring greater than about 5/16 inches.

10. The system of claim 8, wherein a first of the screen media is configured to separate solids measure greater than about ½ inches.

11. The system of claim 8, wherein one or more of the screen media is configured to separate solids measuring greater than about 50 to 200 mesh.

12. The system of claim 1, wherein the first series of baffles comprises three baffles.

13. The system of claim 1, wherein baffles in the first series of baffles are oriented at an angle between 45 and 90 degrees relative to a horizontal ground reference.

14. The system of claim 1, wherein the bar screen is a grizzly bar screen.

15. The system of claim 1, wherein the bar screen comprises grates measuring about ½ inches.

16. The system of claim 1, wherein the second conduit is a pipe having about an 8 inch inner diameter.

17. The system of claim 1, wherein the inlet of the third conduit has a larger inner diameter than an inner diameter of the outlet of the third conduit.

18. The system of claim 17, wherein the third conduit is a pipe having about a 10 inch inner diameter inlet and about an 8 inch inner diameter outlet.

19. The system of claim 1, wherein the fourth conduit is a pipe having about a 12 inch inner diameter.

20. The system of claim 1, wherein the first series of baffles is slanted in a first direction.

21. The system of claim 1, wherein the perforated plate baffle is a perforated plate vertical baffle having slots measuring between about 3/8 inches-3/4 inches.

22. A method for separating solids from a first slurry recovered from a hydrocarbon well, comprising the steps of:

a) providing a first tank including a V-shaped compartment with sloping side walls, a bottom, and a top, the compartment having a front section, a mid-section, and a rear section; one or more second tanks coupled to one or more mixer devices configured to mix contents of the one or more second tanks, the one or more second tanks being located adjacent the rear section of the compartment; a shaftless auger operatively positioned on the bottom of the compartment, the shaftless auger configured for rotation to cause a second slurry containing first solids to move to the front section of the compartment; a suction pump in fluid communication with a first conduit, the first conduit having an inlet and an outlet, the inlet of the first conduit being operatively positioned within the compartment at its front section adjacent the shaftless auger, the suction pump configured to pump the second slurry containing the first solids through the first conduit; one or more hydrocyclone units in fluid communication with the outlet of the first conduit, the one or more hydrocyclone units receiving and processing the second slurry to produce an underflow comprising the first solids and an overflow comprising a first clean fluid flowing through a second conduit; a third conduit having an inlet and an outlet, the third conduit receiving the first slurry recovered from the hydrocarbon well at the inlet and flowing the first slurry through the outlet; a fourth conduit configured to receive the first clean fluid from the one or more hydrocyclone units and the first slurry flowing through the outlet of fourth conduit, the first clean fluid enveloping gas and second solids included in the first slurry to create a third slurry; a diffuser enclosure having a target plate, a bar screen positioned at an angle, a wear liner, and one or more perforated air diffuser baffles, wherein the diffuser enclosure receives on the target plate the third slurry from the fourth conduit, the target plate dispersing the third slurry onto the bar screen passing a fourth slurry through grates in the bar screen leaving third solids from the third slurry on a top surface of the bar screen, the bar screen passing a fifth slurry through the bar screen and into the compartment, wherein a first portion of entrained gas from the fourth slurry passes up through the one or more perforated air diffuser baffles; a linear shaker operatively positioned underneath the one or more hydrocyclone units, the linear shaker configured to receive the underflow from the one or more hydrocyclone units and third solids from the bar screen causing a dewatering of the first solids and of the third solids to produce a dried fourth solids, the linear shaker further configured to convey the dried fourth solids to a conveyor device for disposal, the linear shaker producing an underflow of a sixth slurry comprising a fifth solids, the linear shaker configured for depositing the sixth slurry into the compartment at its front section; a perforated plate baffle placed in the compartment between the midsection and the front section, the perforated plate baffle causing a second portion of entrained gas from the fourth slurry to pass up to the linear shaker via a perforated plate bottom portion of the linear shaker; a first series of baffles operatively positioned within the compartment between the midsection and the rear section, wherein a seventh slurry containing unsettled fine solids flows over the first series of baffles and over an overflow weir at the rear section of the compartment and into the one or more mixing tanks for processing via the one or more mixers;

(b) moving a second slurry containing first solids to the front section of the compartment by rotation of the shaftless auger;

(c) pumping the second slurry containing the first solids through the first conduit to the one or more hydrocyclones;

(d) processing the second slurry in the one or more hydrocyclones to produce an underflow comprising the first solids and an overflow comprising a first clean fluid flowing through the second conduit;

(e) receiving the first slurry recovered from the hydrocarbon well at the inlet of the third conduit and flowing the first slurry through the outlet of the third conduit;

flowing the first clean fluid from the one or more hydrocyclone units and the first slurry flowing through the outlet of fourth conduit into the diffuser enclosure, the first clean fluid enveloping gas and second solids included in the first slurry to create a third slurry;

(g) dispersing the third slurry on the target plate and onto the bar screen to pass a fourth slurry through grates in the bar screen leaving third solids from the third slurry on a top surface of the bar screen, wherein a first portion of entrained gas from the fourth slurry passes up through the one or more perforated air diffuser baffles;

(h) passing a fifth slurry through the bar screen and into the compartment;

(i) depositing the underflow from the one or more hydrocyclone units and the third solids from the bar screen on the linear shaker;

(j) dewatering the first solids and the third solids on the linear shaker to produce a dried fourth solids for conveyance to a conveyor device for disposal;

(k) depositing an underflow of a sixth slurry comprising a fifth solids by the linear shaker into the compartment at its front section;

(l) causing a second portion of entrained gas from the fourth slurry to pass up to the linear shaker via the perforated plate bottom portion of the linear shaker; and (m) flowing a seventh slurry containing unsettled fine solids over the first series of baffles over an overflow weir at the rear section of the compartment and into the one or more mixing tanks for processing via the one or more mixers.

23. The method of claim 22, wherein the system includes a transfer pump, wherein the method further comprises transferring fluid from the one or more mixing tanks to the third conduit or to the compartment via the transfer pump.

24. The method of claim 22, further comprising treating the fluid in the one or more second tanks with a chemical.

25. The method of claim 22, further comprising separating solids greater than about 5/16 inches with a screen media of the linear shaker.

26. The method of claim 22, further comprising separating solids greater than about ½ inches with a screen media of the linear shaker.

27. The method of claim 22, further comprising separating solids greater than about 50 to 200 mesh with a screen media of the linear shaker.

28. The method of claim 22, further comprising separating solids greater than about ½ inches with the bar screen.

29. The method of claim 22, wherein the bar screen is a grizzly bar screen, and wherein steps (g) and (h) are performed with the grizzly bar screen.

* * * * *